United States Patent Office 3,274,118
Patented Sept. 20, 1966

3,274,118
PREPARATION OF STABLE NON-PYROPHORIC ORGANOMETALLIC COMPOSITIONS
Conrad W. Kamienski and Dennis H. Lewis, Bessemer City, N.C., assignors to Lithium Corporation of America, Inc., New York, N.Y., a corporation of Minnesota
No Drawing. Filed Jan. 22, 1962, Ser. No. 167,966
The portion of the term of the patent subsequent to Apr. 30, 1980, has been disclaimed
2 Claims. (Cl. 252—182)

This application is a continuation-in-part of our application Serial No. 107,326, filed May 3, 1961, now Patent No. 3,087,896.

Our invention relates to the preparation of stable non-pyrophoric organometallic compositions.

There are numerous organometallic compounds, generally of metals of Groups I, II and III of the Periodic Table, which are characterized by instability and/or pyrophoricity, even in the form of various organic solvent solutions of said organometallic compounds. Illustrative thereof are the alkyllithium compounds of which n-butyllithium is a typical example. They are conventionally prepared in the form of solutions in normally liquid hydrocarbons such as n-pentane and n-hexane. In this form, the organometallic compounds, exemplified by alkyllithium compounds such as n-butyllithium, possess a number of serious disadvantages with reference to their handling and use. Chief among these disadvantages are the pyrophoricity and the lack of stability of such solutions upon exposure to air and moisture. Because of these characteristics of such heretofore known compositions, special handling, packaging and shipping procedures have been required. Furthermore, in use, such solutions, exemplified by n-hexane solutions of n-butyllithium, have had to be handled in hoods and under an inert atmosphere. All of the circumstances have militated strongly against efforts to develop significant commercial uses for the alkyllithium compounds and other unstable and/or pyrophoric organometallic compounds.

Our invention is predicated upon certain discoveries which enable the production of organometallic compositions in the form of stable and non-pyrophoric mixtures containing substantial proportions of the organometallic compounds. We have found that if the aforesaid organometallic compounds are embodied or incorporated in inert carriers, particularly hydrocarbons or mixtures of hydrocarbons, which are solid or semi-solid at ordinary room temperatures, the resulting compositions are non-pyrophoric and stable in the presence of air and moisture. The novel organometallic compositions of our invention, thus, lend themselves to relatively easy and convenient handling and shipping thereof is greatly facilitated not only from the standpoint of lower costs of shipping containers but, also, from the standpoint of substantial elimination of hazardous shipping problems.

The inert carriers, particularly hydrocarbons, which are solid or semi-solid at room temperatures which we have found to be especially satisfactory for use in the practice of our invention comprise paraffin waxes and petrolatums as well as mixtures of paraffin waxes and petrolatums in various proportions. The paraffin waxes advantageously utilized are those which have melting points in the range of approximately 100 degrees F. to 200 degrees F. Other normally semi-solid to solid carriers can be used so long as they are inert or essentially inert to the organometallic compounds. Thus, for instance, normally semi-solid to solid ethers, which are free from hydroxyl or other reactive groups, can be utilized as, for example, polyphenyl ethers such as diphenyl ether and hydroquinone-1, 4-diphenyl ether and higher polymeric phenyl ethers; as well as the so-called "Carbowaxes," providing that they are essentially freed from any materials containing free hydroxyl groups.

The organometallic compound content of the compositions of our invention is variable and will usually range in amounts up to about 50 weight percent. Particularly satisfactory are those compositions in which the weight percent of the organometallic compound will fall within the range of about 15 to about 25 percent with 20 percent representing a good average.

We have found that the novel compositions of our invention may be prepared in a variety of ways. Illustrative procedures which we have found to be satisfactory may be outlined broadly as follows:

(1) By the direct preparation of the organometallic, for instance, alkyllithium, compound, in the molten normally solid or semi-solid inert carrier, particularly hydrocarbon or hydrocarbon mixture, followed by separation of the organometallic compound-molten inert carrier from the metallic halide by-product followed by solidification of the organometallic compound-molten inert carrier.

(2) By initially preparing the alkyllithium compound or organometallic compound in a solution of a light hydrocarbon solvent such as pentane or hexane, for instance, in accordance with heretofore known prior art methods, after which the inert normally solid or semi-solid carrier, notably hydrocarbon or hydrocarbon mixture, is added either in previously melted form or which, after addition, is heated to its melting temperature, and then stripping off the pentane or hexane under a vacuum, after which the mixture is cooled to allow the normally solid or semi-solid inert carrier to solidify.

(3) By a combination of the procedures described in the above paragraphs (1) and (2), namely, by preparing the alkyllithium compound or other organometallic compound in a light hydrocarbon solution, for example, a pentane or hexane solution, of the normally solid or semi-solid inert carrier, after which the desired product is separated from the lithium halide or other metallic halide by-product and the light hydrocarbon solvent, such as pentane or hexane, is stripped off under a vacuum.

In those cases where the procedures described above under (2) and (3) are employed, various light hydrocarbons other than pentane and hexane can be utilized. In general, such light hydrocarbons comprise straight chain and branched chain hydrocarbons in the range of $C_5H_{12}$ to $C_{10}H_{22}$, additional examples of which are n-heptane and n-octane, as well as mixtures thereof, petroleum ether, aromatic solvents such as benzene, toluene and xylene, and mixtures of aromatic and paraffinic solvents such as lactol spirits or mineral spirits.

While the invention is particularly applicable to the preparation of stable non-pyrophoric compositions in which the organometallic compounds are alkyllithium compounds such as n-butyllithium, other organometallic compounds can also be utilized to produce stable non-pyrophoric compositions as, for example, sec-butyllithium, tert-butyllithium, amyllithium, and, in general, those alkyllithium compounds which are soluble or readily dissolvable in hydrocarbon media; aryl-lithium compounds such as phenyllithium, alpha-naphthyllithium, and thienyllithium; corresponding alkyl and aryl compounds of sodium and potassium; dialkylberyllium, dialkylmagnesium, dialkylcalcium and dialkylzinc compounds; trialkylboron and trialkylaluminum compounds; the alkyl groups of the foregoing compounds being exemplified by propyl, isopropyl, butyl, isobutyl, amyl, iso-amyl, hexyl and iso-hexyl, and, in general, containing from 3 to 8 carbon atoms; and alkylene di-alkali metal compounds, exemplified by trimethylene dilithium, tetramethylene dilithium, pentamethylene dilithium and hexamethylene dilithium, and the corresponding sodium and potassium compounds.

The following examples are illustrative of typical suitable procedures for the preparation of the novel organometallic compositions of the present invention. It will be understood that various changes may be made with reference to the selection of particular normally unstable and/or pyrophoric organometallic compounds, normally solid or semi-solid inert hydrocarbons, proportions of ingredients, and various details of procedure without in any way departing from the principles of the invention in view of the guiding teachings provided herein.

*Example 1.—Preparation of an n-butyllithium-paraffin wax mixture containing 20 weight percent of n-butyllithium, and using a wax composition of 10% petrolatum and 90% paraffin wax*

A mixture of 76.3 grams of a paraffin wax (M.P. 130–132 degrees F.) and 8.5 grams of white petrolatum was melted and charged into a 500 ml. round-bottom flask, fitted with a vacuum connection, an enclosed magnetic stirrer, and an argon flushed, graduated dropping funnel. The dropping funnel contained 130 ml. of a 2.75 molar solution of n-butyllithium in n-hexane, which was then added to the molten wax mixture, after which the funnel was removed and replaced with an adapter and thermometer. The mixture in the flask was heated to 65 degrees C., followed by application of vacuum. Hexane was distilled off and condensed. The initial vacuum of 130 mm. was slowly reduced to 4 mm. All hexane was removed in 20 minutes. Argon was bled into the system to atmospheric pressure. The molten mixture was poured into a cylindrical steel mold (to provide a 10″ stick) which had been placed in a container continuously flushed with argon. After cooling and solidification in the argon atmosphere, the 10″ stick was removed from the mold.

The stick was handled freely in the air, without the usual protective measures necessary with hexane or like light liquid hydrocarbon solutions of n-butyllithium. The n-butyllithium content of various sections of the stick was determined by chemical analysis with the following results:

(a) A transverse center cut:

|   | Wt. percent |
|---|---|
| Active alkyl | 20.8 |
| Total base | 22.4 |

(b) A transverse cut from top of rod:

|   | Wt. percent |
|---|---|
| Active alkyl | 20.8 |
| Total base | 22.3 |

(c) A transverse cut from bottom of rod:

|   | Wt. percent |
|---|---|
| Active alkyl | 20.8 |
| Total base | 22.1 |

The above analyses show the excellent uniformity achieved.

A sample of the composition of the above example was tested for pyrophoricity by melting in air and pouring on moist cotton. There was a slight reaction but no fire or charring of the moist cotton. This is in sharp contrast to the fire and charring of moist cotton which occurs when a solution of n-butyllithium in heptane or hexane is poured on moist cotton. Another sample of the composition produced in accordance with the above example was squeezed between moist filter paper. Again, there was slight reaction but no fire or charring of the moist filter paper, a result also in sharp contrast with that which occurs when a similar experiment is carried out with heptane or hexane solution of n-butyllithium. A further test, in which a sample of the product produced in accordance with the above example was exposed at 42 degrees C. in a 100% relative humidity atmosphere for 1 hour, showed outstanding stability under such adverse conditions, the loss of active alkyl concentration being less than 2%.

*Example 2.—Preparation of a sec-butyllithium-paraffin wax mixture containing 16 weight percent of sec-butyllithium, and using a solid paraffinic hydrocarbon medium consisting of 20 percent petrolatum and 80 percent paraffin wax*

A mixture of 18.6 grams of white petrolatum and 74.4 grams of a paraffin wax (M.P. 136–138 degrees F.) was melted and charged into an argon flushed 500 ml. round-bottomed flask equipped with an enclosed magnetic stirrer, vacuum connection and an argon flushed dropping graduated funnel. The dropping funnel contained 115 ml. of a 2.42 molar solution of sec-butyllithium in n-hexane, which was then added to the molten wax mixture, after which the funnel was removed and replaced with a thermometer and an adapter. The mixture in the flask was heated to 60 degrees C., followed by the application of vacuum. The hexane was distilled off and condensed. The initial vacuum of 130 mm. was reduced slowly to 4 mm. All the hexane was removed in 15 minutes. Argon was bled into the system to atmospheric pressure. The molten mixture was then poured into a cylindrical steel mold (to provide a 10″ stick) which had been placed in a container continuously flushed with argon. After cooling and solidification in the argon atmosphere, the 10″ stick was removed from the mold.

The stick was handled freely in the air without the usual protective measures necessary with liquid hydrocarbon solutions of sec-butyllithium. The sec-butyllithium content of various sections of the stick was determined by chemical analyses (Anal. Chem., 33, pp. 468–470 (1961)) with the following results:

(a) A transverse cut from top of rod:

|   | Wt. percent |
|---|---|
| Active alkyl | 16.7 |
| Total base | 17.6 |

(b) A transverse center cut:

|   | Wt. percent |
|---|---|
| Active alkyl | 16.8 |
| Total base | 17.6 |

(c) A transverse cut from bottom of rod:

|   | Wt. percent |
|---|---|
| Active alkyl | 17.0 |
| Total base | 17.6 |

The above analyses show the excellent uniformity achieved.

A sample of the composition of the above example was exposed for 1 hour at 40 degrees C. in a 100% relative humidity atmosphere under forced air conditions and found to be very stable under these adverse conditions, losing only 2.9% of its active alkyl concentration.

*Example 3.—Preparation of a tert-butyllithium-paraffin wax mixture containing 13.1 weight percent of tert-butyllithium, and using a solid paraffinic hydrocarbon medium consisting of 20 percent petrolatum and 80 percent paraffin wax*

A mixture of 22.0 grams of white petrolatum and 88.0 grams of a paraffin wax (M.P. 136–138 degrees F.) was melted and charged into an argon flushed 500 ml. round-bottomed flask fitted with an enclosed magnetic stirrer, vacuum connection and an argon flushed dropping funnel. The dropping funnel contained 120 ml. of a 2.38 molar solution of tert-butyllithium in pentane which was then added to the molten wax mixture and allowed to distill off. The funnel was removed and replaced with a thermometer and adapter. The mixture was heated to 55 degrees C. and the remaining pentane was removed by vacuum distillation down to below 1 mm. pressure. Argon gas was bled into the system to atmospheric pressure. The molten mixture was poured into a cylindrical steel mold (to provide a 10″ stick) which was placed in a container continuously flushed with argon gas. After cooling and solidification in the argon atmosphere, the 10″ stick was removed from the mold.

The stick was handled freely in air without the usual protective measures necessary for liquid hydrocarbon solutions of tert-butyllithium. The tert-butyllithium content of various sections of the stick was determined by chemical analysis.

(a) Transverse cut from top of rod:

| | Wt. percent |
|---|---|
| Active alkyl | 13.1 |
| Total base | 13.1 |

(b) Transverse center cut:

| | Wt. percent |
|---|---|
| Active alkyl | 13.1 |
| Total base | 13.3 |

(c) Transverse cut from bottom of rod:

| | Wt. percent |
|---|---|
| Active alkyl | 13.1 |
| Total base | 13.3 |

The above analyses show the excellent uniformity achieved.

The same stick was exposed for 1 hour at 40 degrees C. in a 100% relative humidity atmosphere under forced air conditions and found to be very stable under these adverse conditions with essentially no loss of its active alkyl concentration.

What we claim as new and desire to protect by Letters Patent of the United States is:

1. A new and useful composition of matter which is semi-solid to solid at room temperature consisting essentially of (a) at least one semi-solid to solid carrier selected from the group consisting of petrolatum, paraffin waxes, diphenyl ether and hydroquinone-1,4-diphenyl ether, and (b) from about 15 to 50 weight percent of an organometallic compound which is normally unstable when exposed to moisture, said organometallic compound being generally uniformly distributed throughout said carrier, said organometallic compound being selected from the group consisting of alkylsodium and alkylpotassium, dialkylberyllium, dialkylmagnesium, dialkylcalcium and dialkylzinc, trialkylboron and trialkylaluminum, the alkyl radicals containing from 3 to 8 carbon atoms; trimethylenedisodium, trimethylenedipotassium, tetramethylenedisodium, tetramethylenedipotassium, pentamethylenedisodium, pentamethylenedipotassium, hexamethylenedisodium and hexamethylenedipotassium.

2. A new and useful composition of matter which is semi-solid to solid at room temperature consisting essentially of (a) a carrier mixture of a paraffin wax and petrolatum in which the paraffin wax predominates over that of the petrolatum, said paraffin wax having a melting point in the range of 100 to 200 degrees F., and (b) from about 15 to 50 weight percent of trialkylaluminum the alkyl groups of which contain from 3 to 8 carbon atoms, said trialkylaluminum being generally uniformly distributed throughout said carrier.

References Cited by the Examiner

UNITED STATES PATENTS

| 1,255,590 | 2/1918 | Ellis | 252—399 XR |
| 2,863,894 | 12/1958 | Smith | 252—431 XR |
| 3,087,896 | 4/1963 | Kamienski et al. | 252—182 |

LEON D. ROSDOL, *Primary Examiner.*

JULIUS GREENWALD, *Examiner.*

M. WEINBLATT, *Assistant Examiner.*